US011546830B2

(12) United States Patent
Roter

(10) Patent No.: US 11,546,830 B2
(45) Date of Patent: Jan. 3, 2023

(54) METHOD FOR RELAYING A ROUTE DISCOVERY REQUEST IN A MESH COMMUNICATION NETWORK

(71) Applicant: SAGEMCOM ENERGY & TELECOM SAS, Rueil Malmaison (FR)

(72) Inventor: Ziv Roter, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 189 days.

(21) Appl. No.: 16/999,795

(22) Filed: Aug. 21, 2020

(65) Prior Publication Data

US 2021/0076296 A1    Mar. 11, 2021

(30) Foreign Application Priority Data

Sep. 11, 2019  (FR) ..................................... 19/09999

(51) Int. Cl.
 *H04W 40/24* (2009.01)
 *H04W 84/18* (2009.01)
 *H04W 40/12* (2009.01)
 *H04W 40/34* (2009.01)

(52) U.S. Cl.
 CPC ......... *H04W 40/246* (2013.01); *H04W 40/12* (2013.01); *H04W 40/248* (2013.01); *H04W 40/34* (2013.01); *H04W 84/18* (2013.01)

(58) Field of Classification Search
 CPC ........ H04L 45/26; H04L 47/32; H04W 40/12; H04W 40/246; H04W 40/248; H04W 40/34; H04W 84/18
 See application file for complete search history.

(56) References Cited

U.S. PATENT DOCUMENTS

| 7,756,041 | B2* | 7/2010 | Whitehill | H04W 40/10 |
| | | | | 455/452.2 |
| 2007/0097892 | A1* | 5/2007 | Tsang | H04W 28/02 |
| | | | | 370/310 |
| 2010/0195535 | A1* | 8/2010 | Ziller | H04L 45/123 |
| | | | | 370/254 |
| 2012/0195431 | A1* | 8/2012 | Garcia Morchon | H04W 12/06 |
| | | | | 380/270 |

(Continued)

OTHER PUBLICATIONS

May 8, 2020 Search Report issued in French Patent Application No. 1909999.

(Continued)

*Primary Examiner* — Awet Haile
(74) *Attorney, Agent, or Firm* — Oliff PLC

(57) ABSTRACT

For relaying a route-discovery request in order to discover at least one route from a source node device to a destination node device in a communication network comprising other node devices able to act as relays between the source node device and the destination node device, at least one node device among said other node devices dynamically defines a waiting delay value to be applied before relaying the route-discovery request. More precisely, said at least one node device defines the waiting delay value according to a quality level of a link via which the route-discovery request was received.

17 Claims, 3 Drawing Sheets

(56) References Cited

U.S. PATENT DOCUMENTS

| | | | | |
|---|---|---|---|---|
| 2012/0327792 | A1* | 12/2012 | Guo | H04W 40/02 |
| | | | | 370/252 |
| 2015/0271062 | A1* | 9/2015 | Vijayasankar | H04L 45/26 |
| | | | | 370/252 |
| 2018/0368048 | A1* | 12/2018 | Tsuchie | H04W 40/12 |

OTHER PUBLICATIONS

Jianwei et al; "R3E: Reliable Reactive Routing Enhancement for Wireless Sensor Networks;" IEEE Transactions on Industrial Informatics; vol. 10; No. 1; pp. 784-794; Feb. 28, 2014.

Tang et al; "Optimizations for Route Discovery in Asynchronous Duty-Cycling Wireless Networks;" Mobile Adhoc and Sensor Systems (MASS); pp. 155-163; Oct. 8, 2012.

* cited by examiner

METHOD FOR RELAYING A ROUTE DISCOVERY REQUEST IN A MESH COMMUNICATION NETWORK

TECHNICAL FIELD

The present invention relates to the relaying of route-discovery request copies in order to discover at least one route from a source node device to a destination node device in a mesh communication network comprising other node devices able to act as relays between the source node device and the destination node device.

PRIOR ART

In order to discover a suitable route in a mesh communication network from a source node device to a destination node device, it is known for the source node device to broadcast a route-discovery request. This route-discovery request is received by each node device in the network neighbourhood of said source node device and which, by broadcasting, relays said copy of the request if said node device in question is not the destination node device. By gradual broadcasting, a plurality of copies of the route-discovery request are typically received by the destination node device, each of these copies having followed a different route in the mesh communication network. Each node device may however decide not to relay a copy of the route-discovery request when one or more criteria are not met. In particular, in order to decide to relay said copy of the request, the node device in question typically checks whether said copy of the request contains information representing a route cost, from the source node device to said node device in question, that is better than the route cost represented by information contained in another copy of said route-discovery request previously received by said node device in question. In other words, the node device in question, by broadcasting, relays said copy of the request if said copy relates to a route that has followed, from the source node device to said node device in question, a path with a lower cost than any other copy of said request previously received by said node device in question (and therefore for the same route discovery). When said node device in question decides to relay, by broadcasting, said copy of the request, said node device in question updates the route-cost information contained in said copy of the request, so as to take into account the fact that said copy of the request is passed by said node device in question. Thus, according to such a route-discovery mechanism, a plurality of copies of the route-discovery request typically reach the destination node device, each containing cost information for the route that said copy followed in order to be propagated from said source node device to said destination node device. The path taken by the copy of said route-discovery request associated with the best route cost is then selected in order to enable the source node device to transmit data to the destination node device.

This route-discovery mechanism is found in mesh communication networks where node devices act as relays to make it possible to extend the range of the communications. This is in particular the case in certain electrical supply network technologies of the AMM (automated meter management) type that rely on powerline communications PLC in order to collect, from smart electricity meters, energy consumption reading data for electrical installations that said smart electricity meters are respectively responsible for monitoring. This is in particular the case in the context of G3-PLC (registered trade mark) technology. This route-discovery mechanism also applies in other types of mesh communication network, whether they be wired or wireless, as soon as they have a meshing involving there existing several possible routes to enable two node devices to communicate.

This route-discovery mechanism is typically associated with a collision-avoidance mechanism, more particularly of the CSMA/CA (Carrier Sense Multiple Access with Collision Avoidance) type. This collision-avoidance mechanism introduces a random waiting delay before attempting to access the communication medium, which prevents a plurality of node devices attempting to relay at the same time a route-discovery request that they receive substantially at the same moment. This random waiting delay therefore involves a random order of transmission of two messages pending in a node device. Two phenomena may then occur. Firstly, if the mesh communication network is dense, the medium may be sufficiently busy for some transmissions, and therefore some relays of messages such as route-discovery requests, to be abandoned. This occurs if the medium is busy for a predefined number (the macMaxFrameRetries parameter in the G3-PLC specifications) of attempts to pick up the communication medium. This is because the collision-avoidance mechanism checks, before any transmission, whether the medium is already busy, and delays the transmission if such is the case. If the medium is particularly heavily loaded, a transmission may be delayed indefinitely. There is therefore a risk of not envisaging routing via the most optimum node devices, because of a random loss of one or more route-discovery requests. Secondly, if the random order first retransmits a route-discovery request via a first path and then another route-discovery request, for the same source node device and destination node device pair, via a second path of better quality, a following node device on the route may thus take the decision to retransmit the route request twice in a row, which increases the associated broadcasting load downstream.

It is then desirable to overcome these drawbacks of the prior art. It is in particular desirable to provide a solution that makes it possible to reduce the time necessary for discovering an optimum route in such a mesh communication network. It is in particular desirable to provide a solution that makes it possible to reduce the broadcasting load, and therefore the consumption of bandwidth, when routes are discovered in such a mesh communication network.

DISCLOSURE OF THE INVENTION

One object of the present invention is to propose a method for relaying a route-discovery request in order to discover at least one route from a source node device to a destination node device in a mesh communication network also comprising other node devices able to act as relays between the source node device and the destination node device, the method being implemented by at least one node device among said other node devices and comprising the following steps: receiving the route-discovery request to be relayed, the route-discovery request being received via a link having a link quality level; determining a waiting delay to be applied before relaying the route-discovery request; applying the waiting delay to the route-discovery request; and relaying the route-discovery request after expiry of the waiting delay. The waiting delay is determined as follows: when the link quality level is below or equal to a first predefined threshold, the waiting delay is equal to a first default value; when the link quality level is above or equal to a second predefined threshold, the waiting delay is equal to a second default value, the second predefined threshold being strictly higher than the first predefined threshold; and, when the link quality level lies in the range between the first predefined threshold and the second predefined threshold, the waiting delay is below the first default value and, for at least part of the range between the first predefined threshold and the second predefined threshold, the waiting delay is also below the second default value. Thus, by defining the waiting delay in the way disclosed above, priority is given to route-discovery request relays that come from "average" quality links (neither too low nor too high). This makes it possible to treat as a priority routes that do not contain links that may in the long term lack reliability and which limit the number of hops necessary. The discovery time of an optimum route is thus reduced, as well as the broadcasting load, and therefore the consumption of bandwidth.

According to a particular embodiment, the link quality level is a link quality indicator LQI.

According to a particular embodiment, when the link quality level is equal to a predefined value, referred to as the optimum value, between the first predefined threshold and second predefined threshold, the waiting delay is at a minimum.

According to a particular embodiment, the minimum waiting delay is zero.

According to a particular embodiment, the waiting delay changes linearly between the first predefined threshold and the optimum value.

According to a particular embodiment, the waiting delay changes linearly between the optimum value and the second predefined threshold.

According to a particular embodiment,
between the first predefined threshold and the optimum link quality value $$LQI = \frac{(adpLowLQIValue + adpHighLQIValue)}{2},$$

the applicable waiting delay D is defined as follows $$D = LQI \times 2 \times \frac{adpDelayLowLQI}{adpLowLQIValue - adpHighLQIValue} +$$
$$adpDelayLowLQI \times \frac{adpLowLQIValue + adpHighLQIValue}{adpHighLQIValue - adpLowLQIValue}$$

and between the optimum link quality value $$LQI \frac{(adpLowLQIValue + adpHighLQIValue)}{2}$$

and the second predefined threshold, the applicable waiting delay D is defined as follows $$D = LQI \times 2 \times \frac{adpDelayHighLQI}{adpHighLQIValue - adpLowLQIValue} +$$
$$adpDelayHighLQI \times \frac{adpLowLQIValue + adpHighLQIValue}{adpLowLQIValue - adpHighLQIValue}$$

where adpLowLQIValue represents the first predefined threshold, adpHighLQIValue represents the second predefined threshold, adpLowLQIValue represents the first default value and adpHighLQIValue represents the second default value, and where the link quality level is a link quality indicator LQI.

According to a particular embodiment, the route-discovery request includes information indicating whether the path travelled up until then by said route-discovery request includes one or more links judged to be unreliable, the method further comprises the following steps: comparing the link quality level with a third threshold and, consequently, updating as necessary the information indicating whether the path travelled up until then by said route-discover request includes one or more links judged to be unreliable; and, when said path includes one or more links judged to be unreliable, increasing the waiting delay by a predefined additional waiting delay.

According to a particular embodiment, when another route-discovery request is received with the same source node device and destination node device during the waiting delay applied to the route-discovery request to be relayed and when furthermore this other route-discovery request has a better route cost, the method comprises the following step: replacing in a queue the route-discovery request already waiting with said other route-discovery request.

According to a particular embodiment, this other route-discovery request is caused to wait for the remaining time of the waiting delay that was applied to the route-discovery request previously present in a queue.

Another object of the present invention is to propose a computer program that can be stored on a medium and/or downloaded from a communication network, in order to be read by a processor. This computer program comprises instructions for implementing the method mentioned above, when said program is executed by the processor. The invention also relates to an information storage medium storing such a computer program.

Another object of the present invention is to propose a method for relaying route-discovery requests in a mesh communication network also comprising node devices, each node device implementing the method mentioned above.

Another object of the present invention is to propose a node device, referred to as an intermediate node device, configured to relay a route-discovery request in order to discover at least one route from a source node device to a destination node device in a mesh communication network wherein the intermediate node device is intended to be used, the node device comprising: means for receiving the route-discovery request to be relayed, the route-discovery request being received via a link having a link quality level; means for determining a waiting delay to be applied before relaying the route discovery request; means for applying the waiting delay to the route-discovery request; and means for relaying the route-discovery request after expiry of the waiting delay. The intermediate node device is configured so that the waiting delay is determined as follows: when the link quality level is below or equal to a first predefined threshold, the waiting delay is equal to a first default value; when the link quality level is above or equal to a second predefined threshold, the waiting delay is equal to a second default value; the second predefined threshold being strictly higher than the first predefined threshold; and, when the link quality level lies in the range between the first predefined threshold and the second predefined threshold, the waiting delay is below the first default value and, for at least part of the range between the first predefined threshold and the second predefined threshold, the waiting delay is also below the second default value.

Another object of the present invention is to propose a smart electricity meter including the intermediate node device mentioned above.

Another object of the present invention is to propose a mesh communication network comprising a plurality of node devices in accordance with the intermediate node device as mentioned above.

Another object of the present invention is to propose a mesh communication network implemented on an electrical supply network, where the mesh communication network is a powerline communication network comprising a plurality of smart electricity meters as mentioned above.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
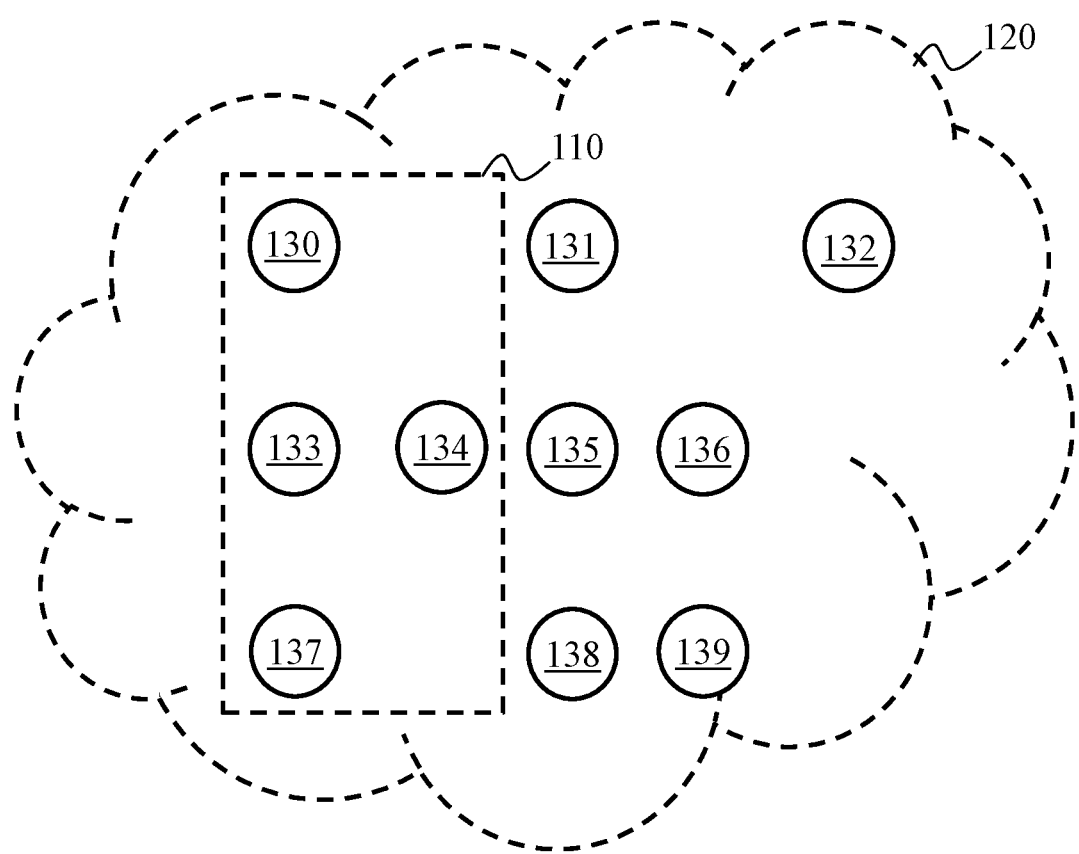
FIG. 1 illustrates schematically a mesh communication network in which the present invention can be implemented.

FIG. 1 illustrates schematically a mesh communication network 120 wherein the present invention can be implemented. The mesh communication network 120 comprises a plurality of node devices (communication nodes) 130 to 139.

A network neighbourhood is associated with each node device in the communication network 120. In FIG. 1, the node device 133 is associated with a network neighbourhood 110 encompassing the node devices 130, 134 and 137. This is because, in the mesh communication network 120, a signal or a message transmitted by a node device (such as the node device 133) is in general not directly visible at every point in said mesh communication network. Each node device sending signals or messages therefore has a network neighbourhood, that is to say a subset of said communication network 120 in which any node device can intelligibly receive said signals or messages directly coming from the node device that transmitted them. The network neighbourhood corresponds to the range of the signals transmitted, according to predetermined transmission parameters (e.g. power, modulation and coding diagram, network topology, etc.) of the node device at the source of said signals and also potentially according to characteristics of the communication channel (attenuation, noise, impedance, etc.).

So as to increase the range of the communications in the communication network 120, node devices fulfil the role of relays to make it possible to establish communications from a source node device (for example the node device 133) to a destination node device (for example the node device 136), which does not form part of the network neighbourhood of said source device. Some communications between node devices may require several successive relays. So as to make it possible to establish communications from the source node device to the destination node device, it is necessary to discover which route, in the mesh communication network 120, the data concerned must take in order to arrive at the destination node device. To do this, the source node device broadcasts a route-discovery request. A copy of this route-discovery request is received by at least one node device in the network neighbourhood of said source node device, and which, by broadcasting, relays said copy of the request if said node device is not the destination node device. This relayed copy is then received by at least one other node device in the network neighbourhood of said node device that made the relay, this other node device then being able to relay said copy in its turn if said other node device also is not the destination node device. By gradual broadcasting, several copies of the route-discovery request are typically received by the destination node device, each of these copies having followed a different route in the mesh communication network 120. Since each of these copies has followed a different route, each of these copies is associated with a route cost that is particular to it. The route followed by the copy having the best route cost is then selected to transmit data from the source node device to the destination node device.

According to a first example, the route cost is a number of hops made by the copy in question from the source node device as far as the destination node device. According to a second example, the route cost is the result of a calculation that depends on the bandwidth of the links followed, by the copy in question, from the source node device as far as the destination node device. Other metrics may be used to establish a route cost, that is to say a transit cost, from the source node device as far as the destination node device.

When a node device receives a route-discovery request, said node device checks whether said route-discovery request must be relayed by said node device in accordance at least with the criteria relating to the route cost associated with said route-discovery request and the route cost of at least one route-discovery request possibly previously received by the same source-destination pair. Criteria other than the route cost criteria may be applied. For example, the criteria in question are those set out in table 9-37 of clause D.11.2 of the G3-PLC specifications.

Preferentially, the mesh communication network 120 is more particularly a powerline communication network that is implemented on an electrical supply network. The node devices of the mesh communication network 120 are then smart electricity meters, making it possible to remotely collect energy consumption reading data for electrical installations (supplied by said electrical supply network), where said smart electricity meters are respectively responsible for reading the energy consumption. It can thus be noted that the present invention is particularly adapted to be implemented in powerline communication networks in accordance with G3-PLC technology.

As detailed below in relation to FIGS. 3 and 4, in order to avoid collision phenomena when a route-discovery request is relayed, each node device of the mesh communication network 120 applies, before relaying, a waiting delay before attempting to access the communication medium to broadcast said route-discovery request. This waiting delay is particularly used in the context of a CSMA/CA mechanism. This waiting delay serves as controlled jitter, and is preferentially introduced between the moment when the node device in question detects that a route-discovery request is to be retransmitted (the node device in question is not the destination of the route sought, and is therefore an intermediary on the route) and the moment when the route-discovery request to be retransmitted is entrusted to the link layer (also referred to as the MAC (medium access control) layer and in particular to the collision avoidance mechanism CSMA/CA.

At least one node device of the mesh communication network 120 determines the waiting delay applicable to a route-discovery request to be relayed according to a link quality indicator LQI with the preceding node device on the route followed up until then by said route-discovery request. The link quality indictor LQI is a current quality metric for the received signal. The link quality indicator LQI supplies an estimation of ease with which a received signal can be demodulated by accumulating the magnitude of the error between the ideal constellations of the modulation applied and a set of symbols of the signal received. By considering two link quality indicator values LQI, the least high of the two indicates a lower link quality. The link quality indicator LQI is preferable to a received signal strength indicator RSSI since, unlike the received signal strength indicator RSSI, the link quality indicator LQI is dependent on the modulation scheme used. However, the behaviours and steps described here in relation to the link quality indicator LQI are applicable with the received signal strength indicator RSSI, or with a combination of the link quality indicator LQI and the received signal strength indictor RSSI. Generally, the waiting delay applicable to a route-discovery request to be relayed is determined according to a link quality level via which said route-discovery request was received.

It should be noted that, on powerline mesh communication networks in accordance with the G3-PLC specifications, the link quality indicator LQI is a unitless number that retranscribes a signal-to-noise ratio SNR, expressed in decibels (dB), on a different scale (ranging typically from 0 to 255). The correspondence rule is then as follows: LQI= (SNR+10)/4. Although the theoretical scale is typically from 0 to 255, the range from 40 (frame practically undetectable) to 120 (frame considered to be perfectly received) is in practice employed. It is therefore in practice considered that, outside this range, the link quality indicator LQI values do not provide any relevant additional information concerning the link quality. In other mesh communication networks, the link quality indicator LQI may change in a different range of values.

It should also be noted that the link quality indicator LQI and the received signal strength indicator RSSI are two metrics supplied by numerous physical-interface components ("chips").

More precisely, the waiting delay applicable to a route-discovery request to be relayed is determined as follows:
when the link quality indicator LQI (or more generally the link quality level) is lower than or equal to a first predefined threshold adpLowLQIValue, the waiting delay is equal to a first default value adpDelayLowLQI;
when the link quality indicator LQI (or more generally the link quality level) is higher than or equal to a second predefined threshold adpHighLQIValue, the waiting delay is equal to a second default value adpDelayHighLQI, the second predefined threshold adpHighLQIValue being strictly higher than the first predefined threshold adpLowLQIValue; and
when the link quality indicator LQI (or more generally the link quality level) lies in the range between the first predefined threshold adpLowLQIValue and the second predefined threshold adpHighLQIValue, the waiting delay is lower than the first default value adpDelayLowLQI, and, for at least part of the range between the first predefined threshold adpLowLQIValue and the second predefined threshold adpHighLQIValue, the waiting delay is also less than the second default value adpDelayHighLQI.

In a particular embodiment, the second default value adpDelayHighLQI is lower than or equal to the first default value adpDelayLowLQI.

Thus, by applying a waiting delay as defined above, priority is not given to the links with a quality that is judged too low (lower than or equal to the first predefined threshold adpLowLQIValue), since, for these links, a robust modulation must be used and there is a high risk of loss of frames if the quality of the link degrades a little further, which means that the routes using such links have a low probability of being adopted. In addition, priority is not given to the links with a quality judged too high (higher or equal to the second predefined threshold adpHighLQIValue), since the routes following such links have a high probability of containing a larger number of hops than other alternative routes. This is because a high link quality (higher than or equal to the second predefined threshold adpHighLQIValue) suggests that the node devices concerned are close to one another, which means that the signal has passed over only a short distance, and therefore the routes using such links have a fairly low probability of being adopted. It is therefore preferable to favour links of quality judged to be average, that is to say those having a good compromise between risk of subsequent loss of frames on the one hand, and route latency and bandwidth consumption on the other hand.

It is indeed a case here of establishing relay priorities by virtue of the variability of the waiting delay, not of eliminating requests for route discovery coming from links with a quality judged to be too low (lower than or equal to the first predefined threshold adpLowLQIValue) or too high (higher than or equal to the second predefined threshold adpHighLQIValue). If the routes available correspond only to criteria that it is wished to avoid, a route may all the same be established.

Figure 2:
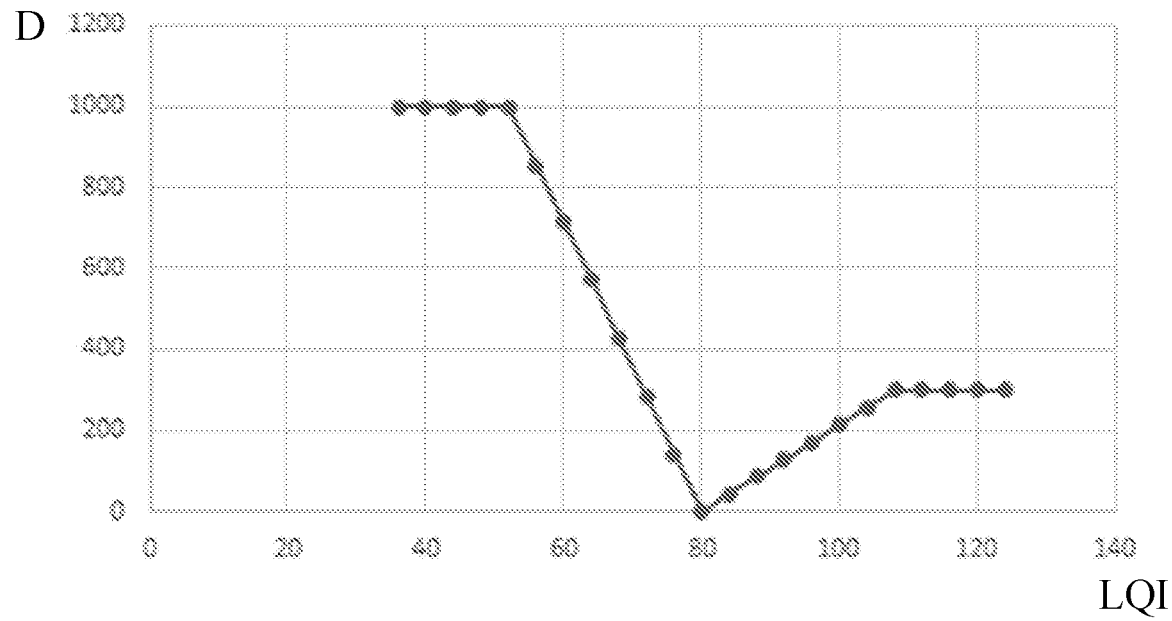
FIG. 2 illustrates schematically a graph for the change in a waiting delay before relaying of a route-discovery request, as a function of a link quality indicator.

An example is presented in FIG. 2, for which the first predefined threshold adpLowLQIValue is fixed at 52, the second predefined threshold adpHighLQIValue is fixed at 108, the first default value adpDelayLowLQI is fixed at 1000 milliseconds (ms) and the second default value adpDelayHighLQI is fixed at 300 milliseconds (ms).

In the particular example embodiment in FIG. 2, an optimum link quality indicator value LQI is fixed at the mean value between the first predefined threshold adpLowLQIValue and the second predefined threshold adpHighLQIValue, that is to say half the sum of the first predefined threshold adpLowLQIValue and of the second predefined threshold adpHighLQIValue, that is to say 80 for the example in FIG. 2. For this optimum value, the waiting delay has a minimum. In a particular embodiment, when the link quality indicator LQI is equal to this optimum value, the waiting delay applied is zero.

In a particular embodiment, the waiting delay applicable changes linearly (as illustrated in FIG. 2) between the first predefined threshold adpLowLQIValue and the optimum link quality indicator LQI value.

In a particular embodiment, the waiting delay applicable changes linearly (as illustrated in FIG. 2) between the optimum link quality indicator LQI value and the second predefined threshold adpHighLQIValue.

Thus, in a particular embodiment, this gives a system with two linear equations with the solution:

between the first predefined threshold adpLowLQIValue and the optimum link quality value $$LQI\frac{(adpLowLQIValue + adpHighLQIValue)}{2},$$

the applicable waiting delay D is defined as follows $$D = LQI \times 2 \times \frac{adpDelayLowLQI}{adpLowLQIValue - adpHighLQIValue} +$$

$$adpDelayLowLQI \times \frac{adpLowLQIValue + adpHighLQIValue}{adpHighLQIValue - adpLowLQIValue}$$

between the optimum link quality value $$LQI\frac{(adpLowLQIValue + adpHighLQIValue)}{2}$$

and the second predefined threshold adpHighLQIValue, the applicable waiting delay D is defined as follows $$D = LQI \times 2 \times \frac{adpDelayHighLQI}{adpHighLQIValue - adpLowLQIValue} +$$

$$adpDelayHighLQI \times \frac{adpLowLQIValue + adpHighLQIValue}{adpLowLQIValue - adpHighLQIValue}$$

In a particular embodiment, the route-discovery request includes information indicating whether the path travelled until then by said route-discovery request includes one or more links judged to be unreliable, that is to say where the link quality indictor LQI is lower than or equal to a third threshold adpWeakLQIValue, in particular defined in the G3-PLC specifications. The third threshold adpWeakLQI-Value is fixed at a value lower than the first predefined threshold adpLowLQIValue. Said information is preferentially a counter of links judged to be unreliable, referred to as weak_link_count. When a node device receives a said route-discovery request, the node device in question compares the link quality indicator LQI associated with said route-discovery request with the third threshold adpWeak-LQIValue, and, consequently, updates as needed the information indicating whether the path travelled up until then by said route-discovery request includes one or more links judged to be unreliable (typically increments by one unit the weak_link_count counter when the link quality indicator LQI is lower than or equal to the third threshold adpWeak-LQIValue). Thus, when the route-discovery request has followed a path including one or more links judged to be unreliable, the waiting delay applicable to said route-discovery request is increased by a predefined additional waiting delay adpDelayWeakLink. According to a first particular embodiment, this predefined additional waiting delay adpDelayWeakLink is fixed, for example, at a third default value equal to 500 milliseconds (ms). According to a second particular embodiment, this predefined additional waiting delay adpDelayWeakLink depends on the value of the weak_link_count counter: the higher the weak_link_count counter, the longer the predefined additional waiting delay adpDelayWeakLink.

In a particular embodiment, during the waiting delay applied to a route-discovery request to be propagated, when the node device in question receives another route-discovery request with the same source and destination and when furthermore this other route-discovery request has a better route cost, the node device replaces in a queue the old route-discovery request (the one that was already pending) with this other route-discovery request. This makes it possible to prevent the node devices downstream from receiving two consecutive route-discovery requests for the same route, which affords savings in bandwidth and processing resources at the downstream node devices. In a particular embodiment, the waiting delay is not recalculated, and this other route-discovery request is put on standby for the remaining time of the waiting delay that was applied to the old route-discovery request.

Figure 3:
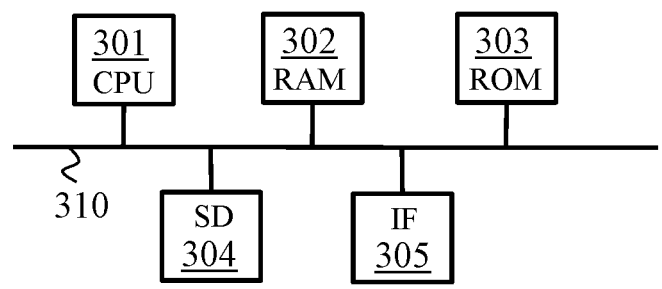
FIG. 3 illustrates schematically an example of hardware architecture of a node device of the mesh communication network of FIG. 1.

FIG. 3 illustrates schematically an example of hardware architecture applicable to each node device in the mesh communication network 120.

The node device comprises, connected by a communication bus 310: a processor or CPU (central processing unit) 301; a random access memory RAM 302, a read only memory ROM 303 or a flash memory; a storage unit or a storage medium reader, such as an SD (Secure Digital) card reader 304 or a hard disk HDD (hard disk drive); at least one communication interface IF 305. In a particular embodiment, the communication interface IF 305 is a powerline communication interface.

The processor 301 is capable of executing instructions loaded in the RAM memory 302 from the ROM memory 303 or from the flash memory, from an external memory, from a storage medium, or from a communication network (potentially other than the mesh communication network 120). When the node device is powered up, the processor 301 is capable of reading instructions from the RAM memory 302 and executing them. These instructions form a computer program causing the implementation, by the processor 301, of all or part of the algorithm, steps and behaviours described here.

Thus all or some of the algorithms, steps and behaviours described here can be implemented in software form by the execution of a set of instructions by a programmable machine, such as a DSP (digital signal processor) or a microcontroller. All or some of the algorithm, steps and behaviours described here may also be implemented in hardware form by a dedicated machine or a dedicated set of components ("chipset") or a dedicated component ("chip") such as an FPGA (field-programmable gate array) or an ASIC (application-specific integrated circuit). Generally, the node device comprises electronic circuitry adapted and configured for implementing the algorithm, steps and behaviours described here.

Figure 4:
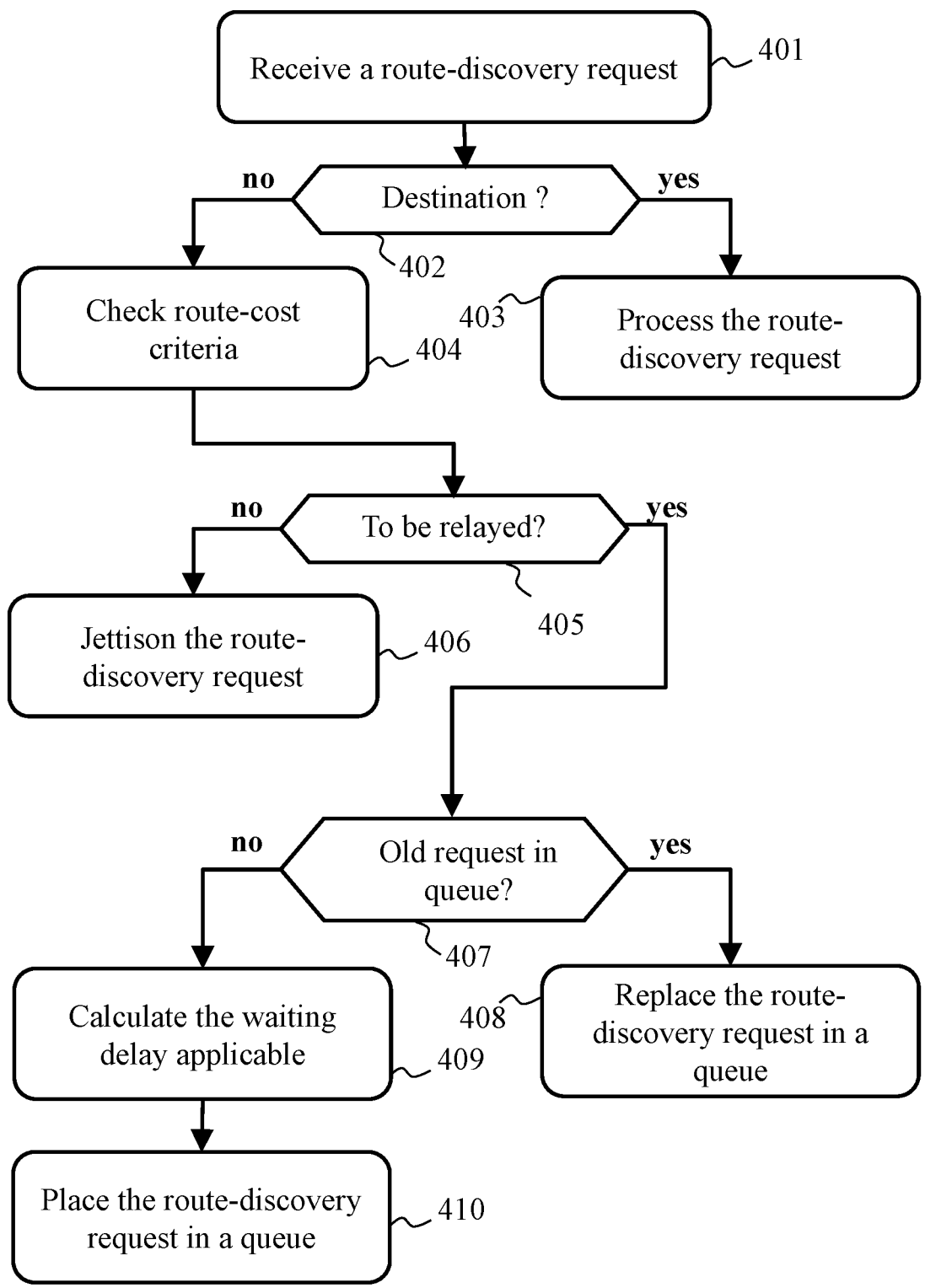
FIG. 4 illustrates schematically an algorithm for relaying a route-discovery request.

FIG. 4 illustrates schematically an algorithm for relaying a route-discovery request. The algorithm in FIG. 4 is implemented by at least one node device of the mesh communication network 120. The algorithm in FIG. 4 is preferentially implemented by each node device of the mesh communication network 120.

In a step 401, said node device receives a route-discovery request.

In a step 402, said node device checks whether said node device is the destination of the route-discovery request, that is to say whether said node device is the destination of the route to be discovered. If such is the case, a step 403 is performed; otherwise a step 404 is performed.

In the step 403, said node device processes the route-discovery request in the context of the selection of the route that has the lowest route cost among the routes discovered. The algorithm in FIG. 4 is then ended.

In the step 404, said node device checks whether the route-discovery request meets the route cost criteria that define whether said route-discovery request must be relayed. Criteria other than the route cost criteria may be applied. For example, the criteria in question are for example those stated in the table 9-37 of clause D.11.2 of the G3-PLC specifications.

In a step 405, said node device checks whether the route-discovery request must be relayed in accordance with said criteria. If such is not the case, a step 406 is performed; otherwise a step 407 is performed.

In the step 406, said node device jettisons the route-discovery request received at the step 401. This is because a route-discovery request having a better route cost has already previously been processed. The algorithm in FIG. 4 is then ended.

In the step 407, which is optional, said node device checks whether another route-discovery request, concerning the same source-destination pair, is present in a queue. In other words, said node device checks whether a waiting delay is underway for another route-discovery request (old route-discovery request) concerning the same source-destination pair. If such is not the case, a step 408 is performed; otherwise a step 409 is performed. In the case where the step 407 is not implemented, the step 409 is directly performed.

In the step 408, said node device replaces in a queue the old route-discovery request with the one received at the step 401. The waiting delay calculated for the old route discovery request remains applicable, and the broadcasting of the route-discovery request by the one received at the step 401 waits until the expiry of the remaining time of the waiting delay calculated for the old route-discovery request.

In the step 409, said node device calculates the waiting delay applicable for the route-discovery request. The waiting delay applicable depends on the quality level of the link via which said node device received said route-discovery request (i.e. the link between said node device and the previous node device on the route followed up until then by the route-discovery request in question). As already indicated, the quality level of the link is preferentially the link quality indicator LQI, but may be the received signal strength indicator RSSI, or a combination of the two.

In the step 401, the node device places the route-discovery request in a queue before said route-discovery request can actually be relayed, that is to say until the waiting delay calculated at the step 409 expires.

Thus, when the waiting delay has elapsed, the node device broadcasts the route-discovery request so that the mesh communication network can attempt to progress said route-discovery request to its destination, unless it has been replaced during the waiting delay by another route-discovery request having a better route cost.

The invention claimed is:

1. A method for relaying a route-discovery request in order to discover at least one route from a source node device to a destination node device in a mesh communication network further comprising other node devices able to act as relays between the source node device and the destination node device, the method being implemented by at least one node device among said other node devices and the method comprising:

receiving the route-discovery request to be relayed, the route-discovery request being received via a link having a link quality level;

determining a waiting delay to be applied before relaying the route-discovery request;

applying the waiting delay to the route-discovery request; and relaying the route-discovery request after expiry of the waiting delay, wherein the waiting delay is determined as follows:

when the link quality level is below or equal to a first predefined threshold, the waiting delay is equal to a first default value;

when the link quality indicator is above or equal to a second predefined threshold, the waiting delay is equal to a second default value, the second predefined threshold being strictly higher than the first predefined threshold; and, when the link quality level lies in the range between the first predefined threshold and the second predefined threshold, the waiting delay is below the first default value and, for at least part of the range between the first predefined threshold and the second predefined threshold, the waiting delay is also below the second default value.

2. The method according to claim 1, wherein the link quality level is a link quality indicator LQI.

3. The method according to claim 1, wherein, when the link quality level is equal to a predefined value, referred to as the optimum value, between the first predefined threshold and second predefined threshold, the waiting delay is at a minimum.

4. The method according to claim 3, wherein the minimum waiting delay is zero.

5. The method according to 4 claim 3, wherein the waiting delay changes linearly between the first predefined threshold and the optimum value.

6. The method according to claim 5, wherein between the first predefined threshold and the optimum link quality value $$LQI \frac{(adpLowLQIValue + adpHighLQIValue)}{2},$$

the applicable waiting delay D is defined as follows $$D = LQI \times 2 \times \frac{adpDelayLowLQI}{adpLowLQIValue - adpHighLQIValue} + adpDelayLowLQI \times \frac{adpLowLQIValue + adpHighLQIValue}{adpHighLQIValue - adpLowLQIValue}$$

and between the optimum link quality value $$LQI \frac{(adpLowLQIValue + adpHighLQIValue)}{2}$$

and the second predefined threshold, the applicable waiting delay D is defined as follows $$D = LQI \times 2 \times \frac{adpDelayHighLQI}{adpHighLQIValue - adpLowLQIValue} + adpDelayHighLQI \times \frac{adpLowLQIValue + adpHighLQIValue}{adpLowLQIValue - adpHighLQIValue}$$

where adpLowLQIValue represents the first predefined threshold, adpHighLQIValue represents the second predefined threshold, adpLowLQIValue represents the first default value and adpHighLQIValue represents the second default value, and where the link quality level is a link quality indicator LQI.

7. The method according to claim 3, wherein the waiting delay changes linearly between the optimum value and the second predefined threshold.

8. The method according to claim 7, wherein $$LQI \frac{(adpLowLQIValue + adpHighLQIValue)}{2},$$

between the first predefined threshold and the optimum link quality value the applicable waiting delay D is defined as follows $$D = LQI \times 2 \times \frac{adpDelayLowLQI}{adpLowLQIValue - adpHighLQIValue} +$$
$$adpDelayLowLQI \times \frac{adpLowLQIValue + adpHighLQIValue}{adpHighLQIValue - adpLowLQIValue}$$

$$LQI \frac{(adpLowLQIValue + adpHighLQIValue)}{2}$$

and between the optimum link quality value and the second predefined threshold, the applicable waiting delay D is defined as follows $$D = LQI \times 2 \times \frac{adpDelayHighLQI}{adpHighLQIValue - adpLowLQIValue} +$$
$$adpDelayHighLQI \times \frac{adpLowLQIValue + adpHighLQIValue}{adpLowLQIValue - adpHighLQIValue}$$

where adpLowLQIValue represents the first predefined threshold, adpHighLQIValue represents the second predefined threshold, adpLowLQIValue represents the first default value and adpHighLQIValue represents the second default value, and where the link quality level is a link quality indicator LQI.

9. The method according to claim 1, wherein the route-discovery request includes information indicating whether the path travelled up until then by said route-discovery request includes one or more links judged to be unreliable, the method further comprises the following steps:

comparing the link quality level with a third threshold and, consequently, updating as necessary the information indicating whether the path travelled up until then by said route-discover request includes one or more links judged to be unreliable; and, when said path includes one or more links judged to be unreliable, increasing the waiting delay by a predefined additional waiting delay.

10. The method according to claim 1, wherein, when another route-discovery request is received with the same source node device and destination node device during the waiting delay applied to the route-discovery request to be relayed and when furthermore this other route-discovery request has a better route cost, the method comprises the following step:

replacing in a queue the route-discovery request already waiting with said other route-discovery request.

11. The method according to claim 10, wherein this other route-discovery request is caused to wait for the remaining time of the waiting delay that was applied to the route-discovery request previously present in a queue.

12. A method for relaying route-discovery requests in a mesh communication network further comprising node devices, each node device implementing the method according to claim 1.

13. Non-transitory information storage medium storing a computer program comprising instructions causing execution of the method according to claim 1 when said instructions are executed by a processor.

14. A node device, referred to as an intermediate node device, configured to relay a route-discovery request in order to discover at least one route from a source node device to a destination node device in a mesh communication network wherein the intermediate node device is intended to be used, the node device comprising electronics circuitry configured to:

receive the route-discovery request to be relayed, the route-discovery request being received via a link having a link quality level;

determine a waiting delay to be applied before relaying the route discovery request;

apply the waiting delay to the route-discovery request; and relay the route-discovery request after expiry of the waiting delay, wherein the waiting delay is determined as follows:

when the link quality level is below or equal to a first predefined threshold, the waiting delay is equal to a first default value;

when the link quality indicator is above or equal to a second predefined threshold, the waiting delay is equal to a second default value; the second predefined threshold being strictly higher than the first predefined threshold; and when the link quality level lies in the range between the first predefined threshold and the second predefined threshold, the waiting delay is below the first default value and, for at least part of the range between the first predefined threshold and the second predefined threshold, the waiting delay is also below the second default value.

15. A smart electricity meter including the node device according to claim 14.

16. A mesh communication network implemented on an electrical supply network, where the mesh communication network is a powerline communication network comprising a plurality of smart electricity meters according to claim 15.

17. A mesh communication network comprising a plurality of node devices according to claim 14.

* * * * *